United States Patent [19]
Bright et al.

[11] Patent Number: 5,879,496
[45] Date of Patent: *Mar. 9, 1999

[54] METHOD OF LABELING ARTICLES HAVING CONVEX SURFACES

[75] Inventors: Lyn E. Bright, Ceres; Hugh E. Cummins, Turlock, both of Calif.

[73] Assignee: B&H Manufacturing Company, Inc., Ceres, Calif.

[*] Notice: The term of this patent shall not extend beyond the expiration date of Pat. No. 5,403,416.

[21] Appl. No.: 464,668

[22] PCT Filed: Dec. 14, 1993

[86] PCT No.: PCT/US93/12165

§ 371 Date: Nov. 17, 1995

§ 102(e) Date: Nov. 17, 1995

[87] PCT Pub. No.: WO94/14611

PCT Pub. Date: Jul. 7, 1994

Related U.S. Application Data

[63] Continuation-in-part of Ser. No. 992,627, Dec. 18, 1992, Pat. No. 5,403,416.

[51] Int. Cl.⁶ ........................................ B32B 31/26
[52] U.S. Cl. ..................... 156/86; 156/446; 156/447; 156/450; 156/499; 156/DIG. 11; 156/DIG. 13; 156/DIG. 26; 156/DIG. 51
[58] Field of Search ............................. 156/85, 86, 184, 156/189, 449, 187, 446, 447, 497, 499, 566, 567, 568, DIG. 9, DIG. 10, DIG. 11, DIG. 12, DIG. 13, DIG. 25, DIG. 26, DIG. 31, DIG. 51, 450; 40/310, 321, 324, 327, 331, 628, 630; 428/11

[56] References Cited

U.S. PATENT DOCUMENTS

| | | | |
|---|---|---|---|
| 3,829,348 | 8/1974 | Spiegel et al. | 156/86 |
| 4,108,710 | 8/1978 | Hoffmann | 156/450 |
| 4,285,746 | 8/1981 | De Puy et al. | 156/86 |
| 4,315,573 | 2/1982 | Bradley et al. | 156/86 |
| 4,406,721 | 9/1983 | Hoffmann | 156/86 |
| 4,500,386 | 2/1985 | Hoffman | 156/449 |
| 4,574,020 | 3/1986 | Fosnaught . | |
| 4,704,173 | 11/1987 | Hoffman | 156/86 |
| 4,795,031 | 1/1989 | Voss et al. | 156/86 |
| 4,844,760 | 7/1989 | Dickey . | |
| 4,980,014 | 12/1990 | DiFrank et al. . | |
| 5,037,499 | 8/1991 | Bright et al. | 156/568 |
| 5,403,416 | 4/1995 | Bright et al. | 156/86 |

*Primary Examiner*—Richard Crispino
*Attorney, Agent, or Firm*—Brooks & KushmanP.C.

[57] ABSTRACT

Method for applying heat shrinkable segments of material (16) (e.g., labels or ornamental bands) to articles (25) (e.g., containers or ornaments) which have convex surfaces. The segment (16) is attached at both ends by adhesive to the convex surface (46) (or the trailing end of the segment (16) may be lapped over and adhesively attached to the leading end of the segment (16)). The adhesive attachments are confined to a narrow sector, e.g., the sector of widest diameter, or a circumference of a sphere, leaving major portions of the segment (16) on either side of such narrow sector unattached. These major portions are then heat shrunk onto the convex surface (46).

5 Claims, 10 Drawing Sheets

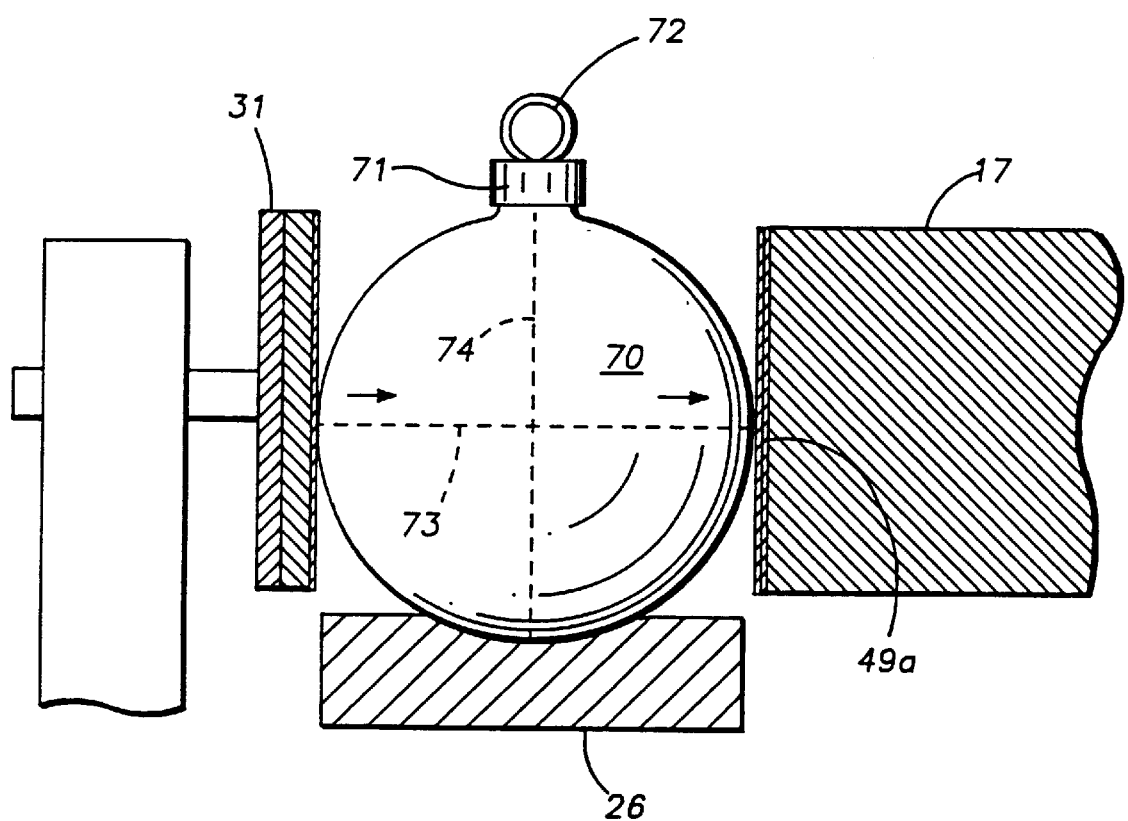
FIG.—9

METHOD OF LABELING ARTICLES HAVING CONVEX SURFACES

CROSS REFERENCE TO RELATED APPLICATIONS

This application is a 35 U.S.C. § 371 filing of PCT/US93/12165, which is a continuation-in-part of U.S. application Ser. No. 07/992,627, filed Dec. 18, 1992, now U.S. Pat. No. 5,403,416.

This invention relates to applying heat shrinkable films to articles such as bottles, other containers and ornamental or novelty items such as Christmas tree ornaments, artificial Easter eggs, etc.

BACKGROUND OF THE INVENTION

It is known and commonly practiced to apply heat shrinkable films such as labels to the cylindrical portions or bodies of containers by adhering the leading end of a label to the body by means of an adhesive, then wrapping the label around the body of the container and attaching the trailing end by adhesive to the container or lapping it over and attaching it to the leading end of the label. In carrying out this process the upper edge of the label and/or the lower edge of the label is allowed to extend over an inwardly sloping or contoured portion such as the shoulder of a bottle without being attached thereto. Thereafter heat is applied to shrink the unattached edge or edges onto the contoured portions of the container.

This method has been quite successful. However, a problem exists when the surface (or a portion of the surface) to which the label is applied is convex and presents a sector of maximum diameter or circumference with the remainder of the convex surface sloping inwardly toward the axis of the article. Heretofore it has been proposed, as in Spiegel U.S. Pat. No. 3,829,348 to apply a decorative heat shrinkable film to a spheroidal or spherical ornamental article such as a Christmas tree ornament or artificial Easter egg by providing the film in the form of a tube which is oversize in relation to the circumference of the ornament, fitting the tube over the article and then heat shrinking it onto the article.

Another approach to the problem is represented by Inoue U.S. Pat. No. 4,225,049 which applies a heat shrinkable film to a container, such having a convex portion presenting a sector of maximum diameter and circumference. An example of such a container is the familiar Coke® bottle ("Coke®" and the shape of the bottle are both trademarks of Coca-Cola Company. Inoue, like Spiegel, provides a preformed tube of heat shrinkable film material which, however is smaller in diameter than the maximum circumference of the container. This tube is stretched and fitted over the container and is released and it is held in place by the elasticity of the film. It is then heated to shrink the entire tube onto the container.

Both such approaches have serious disadvantages such as the necessity to preform the tube in one operation and on one piece of equipment, then remove it and place it over the container or ornament and shrink it onto the container ornament.

OBJECTS OF THE INVENTION

It is an object of the present invention to provide improvements upon heat shrink application of segments of heat shrinkable sheets to convex surfaces of articles.

It is a particular object of this invention to provide an apparatus, a system and a method whereby heat shrinkable material may be applied rapidly to, and attached sufficiently for the purpose to a convex sector on an article, and then heated to shrink the remainder of the material properly onto the convex portion and, if desired, onto other parts of the article.

Yet another object is to provide articles so wrapped.

The above and other objects of the invention will be apparent from the ensuing description in the appended claims.

SUMMARY OF THE INVENTION

In accordance with the present invention a segment of heat shrinkable film is attached to the widest portion or circumference of a convex surface by adhesive confined to the leading end, then the segment is wrapped around the article and the trailing end is attached to the article or it is lapped over the leading end of the segment and it is attached by means of an adhesive. In this operation as thus far described only a narrow sector of the film or segment aligned with the sector of maximum circumference of the article is attached adhesively to the article and it leaves portions of the segment above and below this narrow sector unattached. Then heat is applied to shrink the entire segment including the unattached upper and lower parts onto the article.

BRIEF DESCRIPTION OF THE DRAWINGS

FIG. 9 is a view similar to that of FIG. 3 but showing application of such a band to a Christmas tree ornament of FIG. 8.

DETAILED DESCRIPTION OF THE PREFERRED EMBODIMENTS

Figure 1:
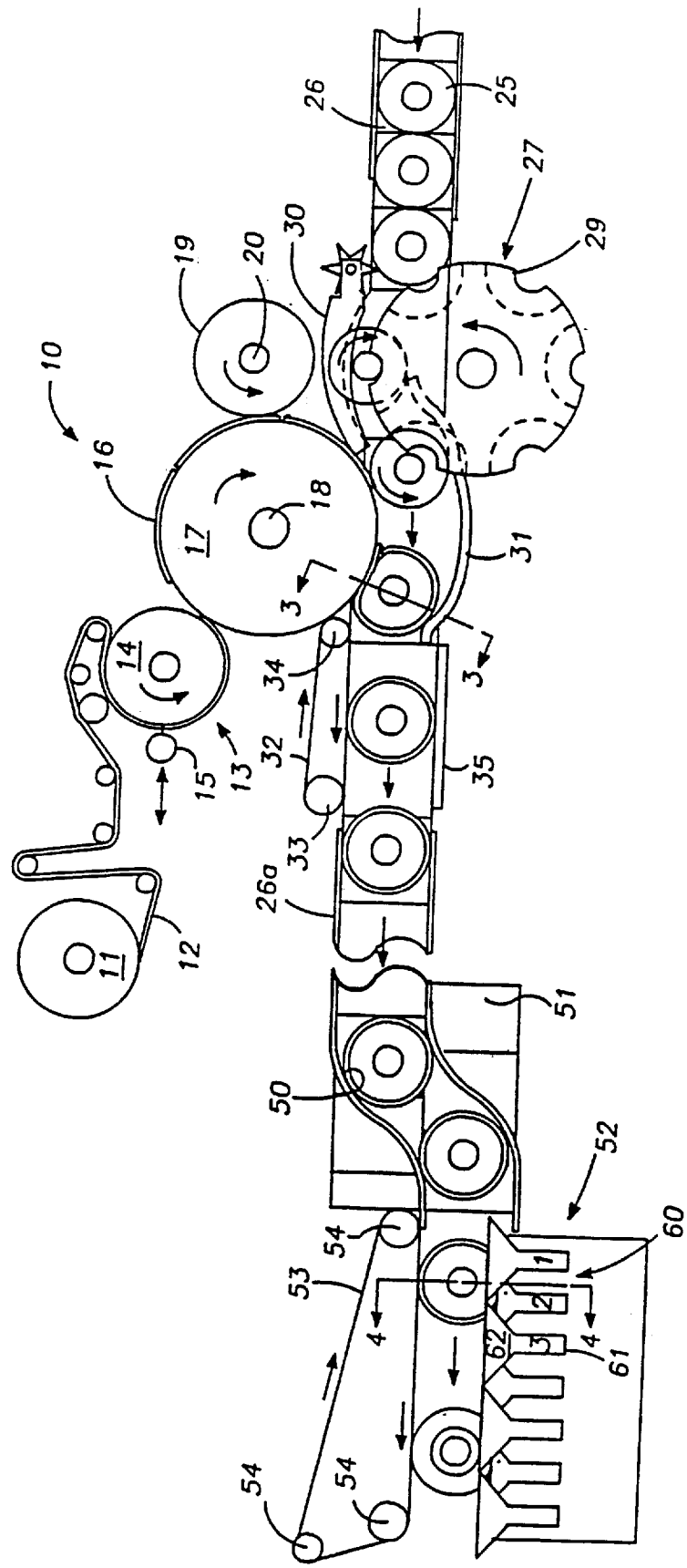
FIG. 1 is a top plan view of a system for applying heat shrinkable labels to articles such as containers having a convex sector to which it is desired to apply the labels.

Referring now to the drawings, and first to FIG. 1, a system designated by the reference numeral 10 is provided, including a roll 11 of heat shrinkable label material 12 which is fed continuously by way of a series of guide, tensioning and drive rollers (unnumbered) to a cutter 13 comprising a back-up roller 14 and a rotating or oscillating cutter roller or knife 15 which severs individual labels 16 from the continuous label stock and deposits each label on a vacuum drum 17 rotating with a shaft 18. Preferably each label is cut after its leading end is deposited on the vacuum drum and the vacuum drum 17 is rotated at a surface speed slightly exceeding the speed of the label material 12 to apply a small tension to the label material. Each label, in turn, is rotated past a glue applicator 19 rotating on a shaft 20 which applies hot melt glue and/or solvent to the leading end of the label and to the trailing end of the label.

The equipment thus far described may be of well known construction such as that described in U.S. Pat. No. 4,108,110.

Containers 25, described in detail below with reference to FIG. 2, enter the system at the right as viewed in FIG. 1 on a conveyor 26. Each container, in turn, is delivered to a star wheel 27 rotating with a shaft 28 and is deposited in a pocket 29 and is then trapped between a curved guide or roll-on pad 30 and the star wheel. Each container in turn is released by the star wheel as the star wheel continues rotation and enters the space between a curved roll-on pad 31 and the vacuum drum 17, such pad being concentric to the vacuum drum. Vacuum is released for each label as it reaches the point of contact with a container, so that it can be wound around the container as the container spins, the adhesive at the leading and trailing ends of the label serving to adhere the container, either in a full wrap fashion wherein the trailing end is lapped over and adhered to the leading end, or what is termed a "spot label" where the trailing end does not extend to the leading end of the label. The labeled container is then released to the conveyor 26a, being spun and compressed by a belt 32 on rollers 33 and 34 and a plate or pad 35 to more securely attach the label to the container.

The star wheel-roll on pad-container feed and spinning means may be, e.g., that shown in U.S. Pat. No. 4,500,386.

Figure 2:
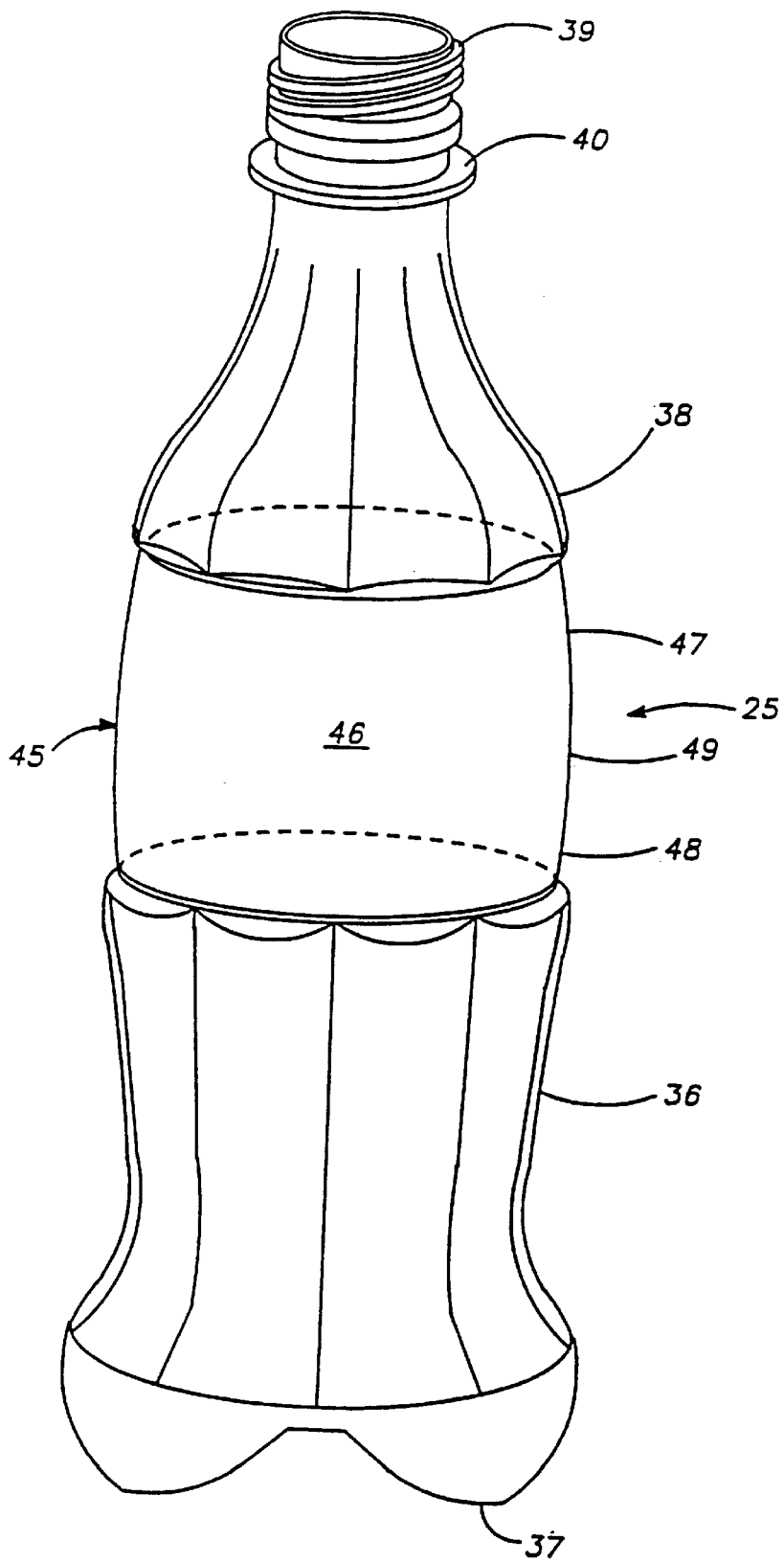
FIG. 2 is a view in elevation of a container of the type described above.

Referring now to FIG. 2, a container 25 having the shape of the Coke® bottle (which shape is a trademark of Coca-Cola Company is shown in elevation, such being of plastic construction, e.g., PET, polyethylene, polyvinyl chloride or polypropylene of a grade and thickness suitable for construction of container. The container may be made of glass, metal or other material but usually it is made of plastic. This container is shaped as follows: There is a lower portion 36 which is fluted as shown for purposes of decoration and/or reinforcement; there is a bottom portion including projections 37 which provide the bottom of the bottle; there is an upper inwardly sloping neck or shoulder portion 38 which is also fluted and there is a threaded top 39 to receive a screw cap and a projecting ring 40 which is useful in transporting the container, empty or filled, from place to place as needed.

The manufacture of such containers is well known. The threaded top is commonly made by injection molding and is attached to a tube of thinner material which is blown in a mold into the shape which is shown.

Between the lower portion 36 and the upper portion 38 is a contoured mid-portion or sector 45 presenting a convex surface 46 including an upper portion 47, a lower portion 48 and a mid-portion or area of maximum diameter 49. The sector 46, or label panel as it is known, is thinner than the upper and lower portions 37 and 38. Typically such container is of twenty ounce size, but the present invention is applicable to larger and smaller containers and to containers of other shapes which have in common a sector which is convex. Such convex sector may constitute larger or smaller portion of the overall surface of the container.

The usual purpose of the contoured sector 45, besides being an integral part of the structure, is to receive a label.

It is, of course, desirable that the label be applied smoothly, evenly, attractively and securely. This presents a problem in that a non-shrinkable label, if applied properly, requires pressure from some kind of pressure member to conform it to the convex surface 46. This is difficult to achieve. A heat shrinkable label can be applied to the portion 49 of maximum diameter but this also presents a problem in that initial application to the portion 49 of maximum diameter is difficult unless a pressure member or a matching concave shape is employed.

Figure 3:
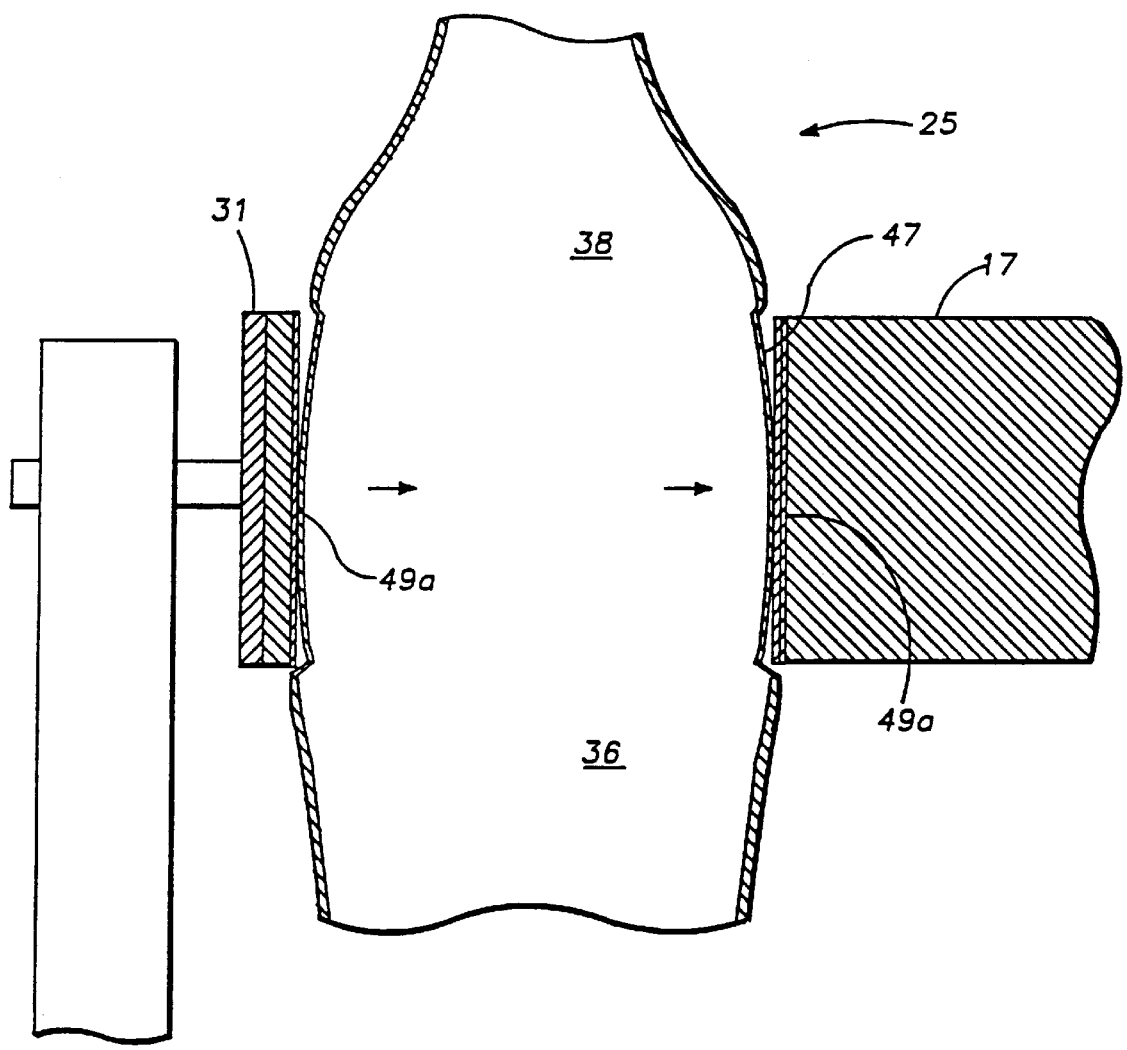
FIG. 3 is a section taken along the line 3—3 of FIG. 1 showing how a label is initially applied to a container.

Referring now to FIG. 3, a container 25 of the type shown in FIG. 2 is shown squeezed between the vacuum drum 17 and the roll-on pad 31. The container is shown in section and the vacuum drum and roll-on pad are shown in section. A label 16 is shown trapped between the container 25 and vacuum drum 17 and between the container 25 and the roll-on pad 31 at the mid-section 49 of maximum diameter. The spacing of the drum 17 and the roll-on pad 31 are such as to squeeze the mid-section 45 inwardly, creating a small flat area shown at 49a to which the label adheres sufficiently for purposes of the invention.

The container 25, being plastic, is flexible and is amenable to such a flattening operation. If a glass container or a container of thick plastic or other material which is not flexible is used, such may not be possible. However, by using a good quality of adhesive and/or applying an adequate pressure the label may be secured sufficiently for subsequent operations as hereinafter described.

Figure 4:
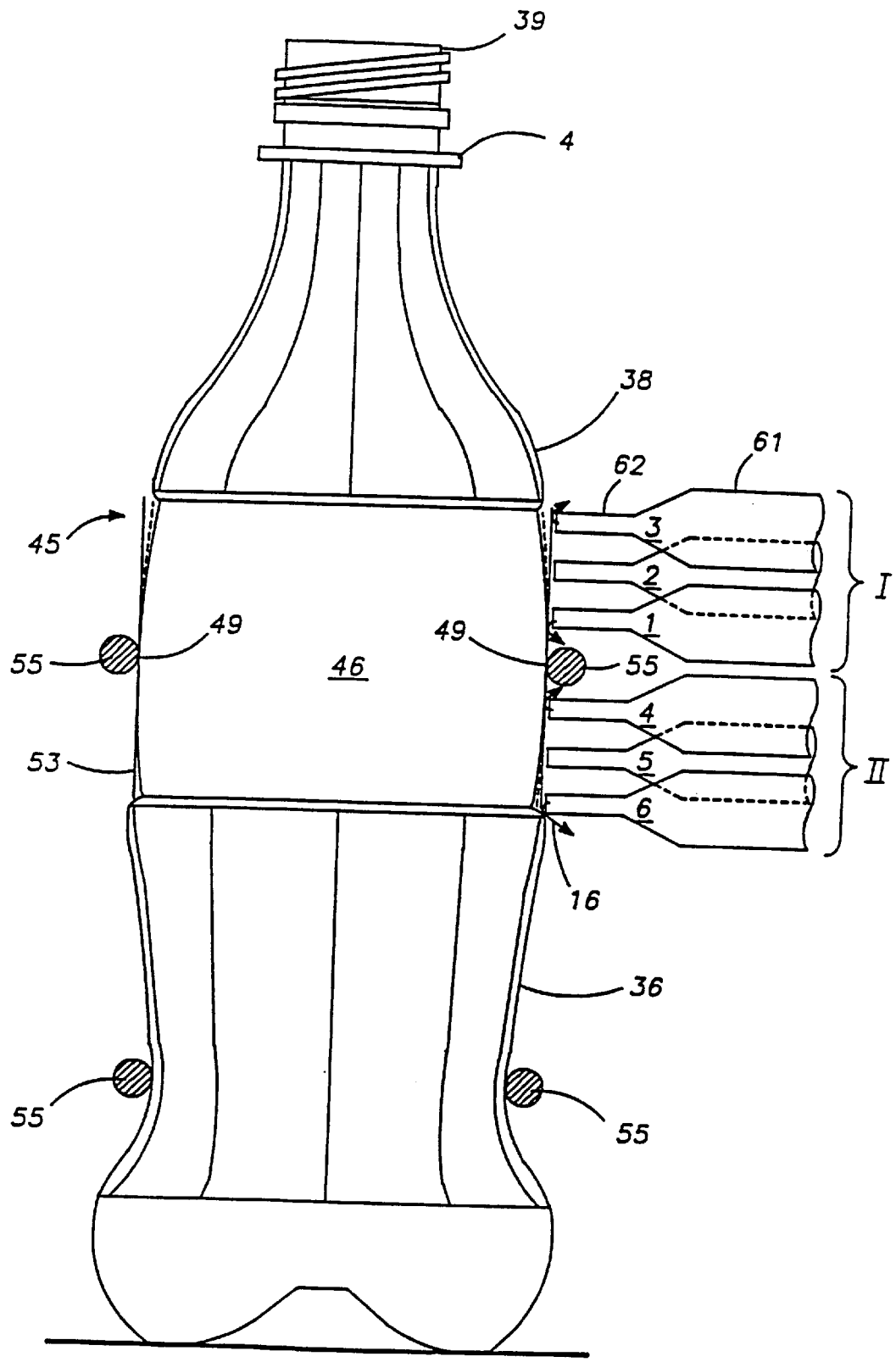
FIG. 4 is a section taken along the line 4—4 of FIG. 1 showing how hot air is applied to complete the label application.

Referring again to FIG. 1, containers 25 to which labels are thus initially applied pass from conveyor 26a through a connecting conveyor 50 onto a conveyor 51 which moves the initially labeled containers through a heat shrink station 52, the containers being spun by a belt 53 trained around rollers 54 of which one is driven, the containers being restrained against lateral movement by rods 55, see FIG. 4. Two of the rods 55 is located to contact the label 16 and the container 25 at the area 49 of greatest diameter.

Figure 5:
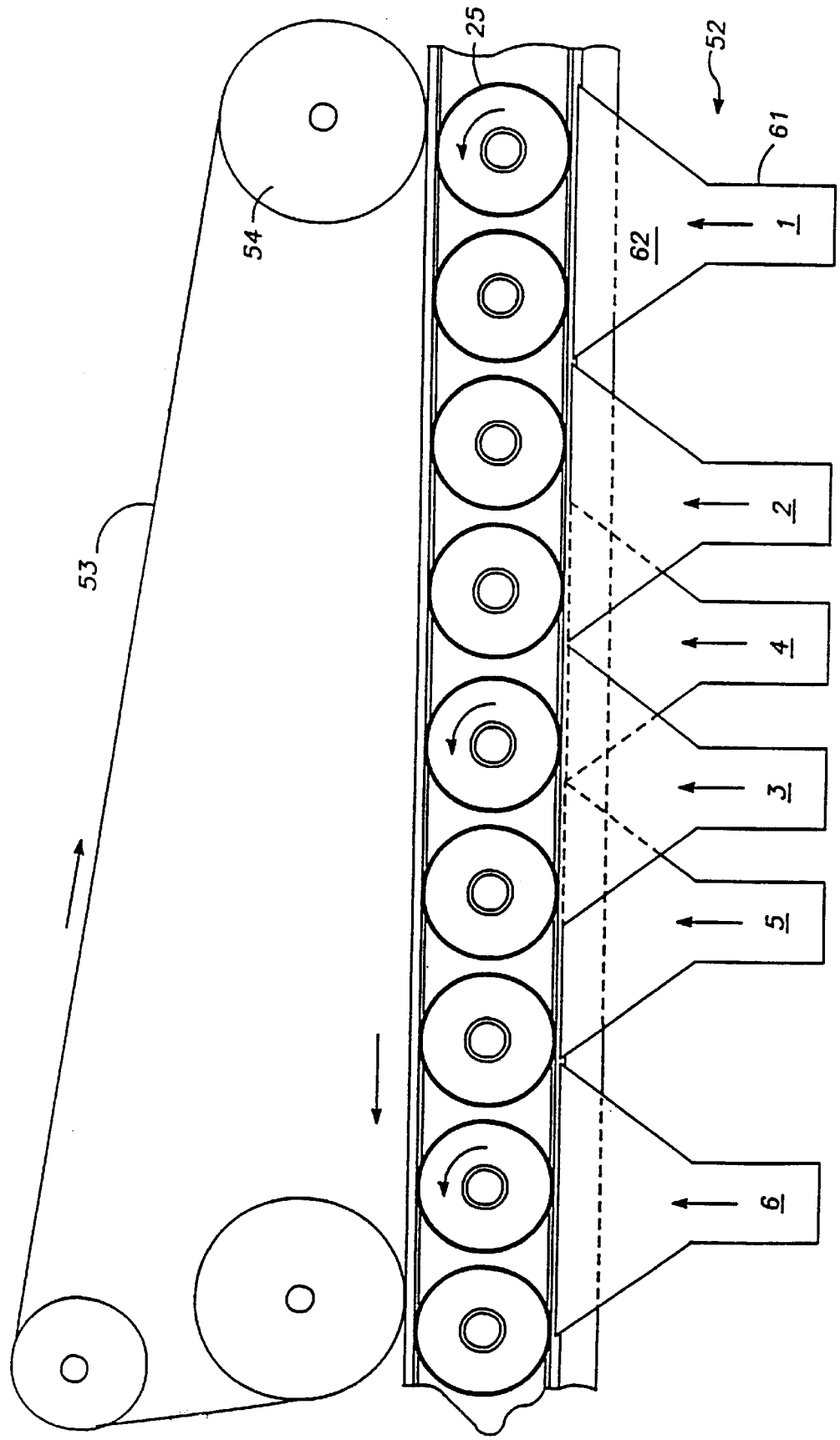
FIG. 5 is a view looking down on the heating station.

Referring now to FIGS. 4 and 5, a series of nozzles 60 are provided each having an inlet tube 61 and a fan shaped mouth 62, each tube being connected to an electric heater and an air blower (not shown) which can be adjusted as to temperature, volume and velocity of the air. There is an upper set of nozzles indicated as I and a lower set of nozzles indicated as II. The upper set I is aligned with the portion of the label 16 which is above the mid-portion 49 of maximum diameter and the lower set II is aligned with the label below such mid-portion. The mouth 62 delivers a wide but thin current of hot air which may be described as knife-like.

Referring more particularly to FIG. 4, the nozzles in the upper set I are numbered 1, 2 and 3; the lowest of these nozzles, numbered 1, is juxtaposed to the label 16 just above the mid-portion 49 of the sector 45; No. 2 is located just above No. 1; and No. 3 is located near the top of label 16.

The lower set II are numbered 4, 5 and 6; No. 4 is located just below the mid-portion 49; No. 5 is located lower; and No. 6 is located near the bottom edge of the label 16.

Referring now to FIG. 5, the nozzles of set I are arranged as shown; i.e., with nozzle 1 being located at the starting point of the heating station 52; nozzle 2 being downstream and nozzle 3 being still further downstream at about midpoint of the heating station 52.

The lower set II of nozzles 4, 5 and 6 are similarly arranged with No. 4 being upstream relative to No. 5 and No. 5 being upstream relative to No. 6.

As a container 25 travels through the heating assembly 52 with a label attached at the mid-portion 49 of the container and spins as it travels, the label is first heated by nozzle 1, which causes it to shrink onto the container near the mid-portion 49; then it is heated by nozzle 2 and is caused to shrink farther up; and then it is heated by nozzle 3 and is caused to shrink so that the entire upper part of the label is shrunken onto the sector 47 of the container.

The same procedure is carried out by nozzles 4, 5 and 6 causing first that portion of the label close to the mid-portion 49 to shrink onto the container, then a portion farther down and finally the lower most portion is shrunk onto the container.

Variants of this progressive heat shrinking procedure may be employed. For example, the lower set of nozzles 4, 5 and 6 may be located directly below the upper set of nozzles; or the two sets may be overlapping in relation to their distribution along the path of travel; or the lower set II may precede the upper set I. Also, the number of nozzles in each set may vary. For example, either set may consist of two or even one nozzle where the region 47 and/or the region 48 is short. Where one of the portions 47, 48 is longer than the other it may be provided with more nozzles than the other portion.

Another consideration is as follows: It is desirable to limit the shrinkage as much as possible to shrinkage along the length of the label, i.e., in the direction of the leading and trailing ends of the label and to minimize shrinkage across the label, i.e., in the direction of the upper and lower edges of the label. Accordingly, heat shrinkable labeling material having such a property is preferred, such being well known in the art.

Also the air speed and temperatures should be such as to cause the desired shrinkage but not to distort the film or the container.

Figure 6:
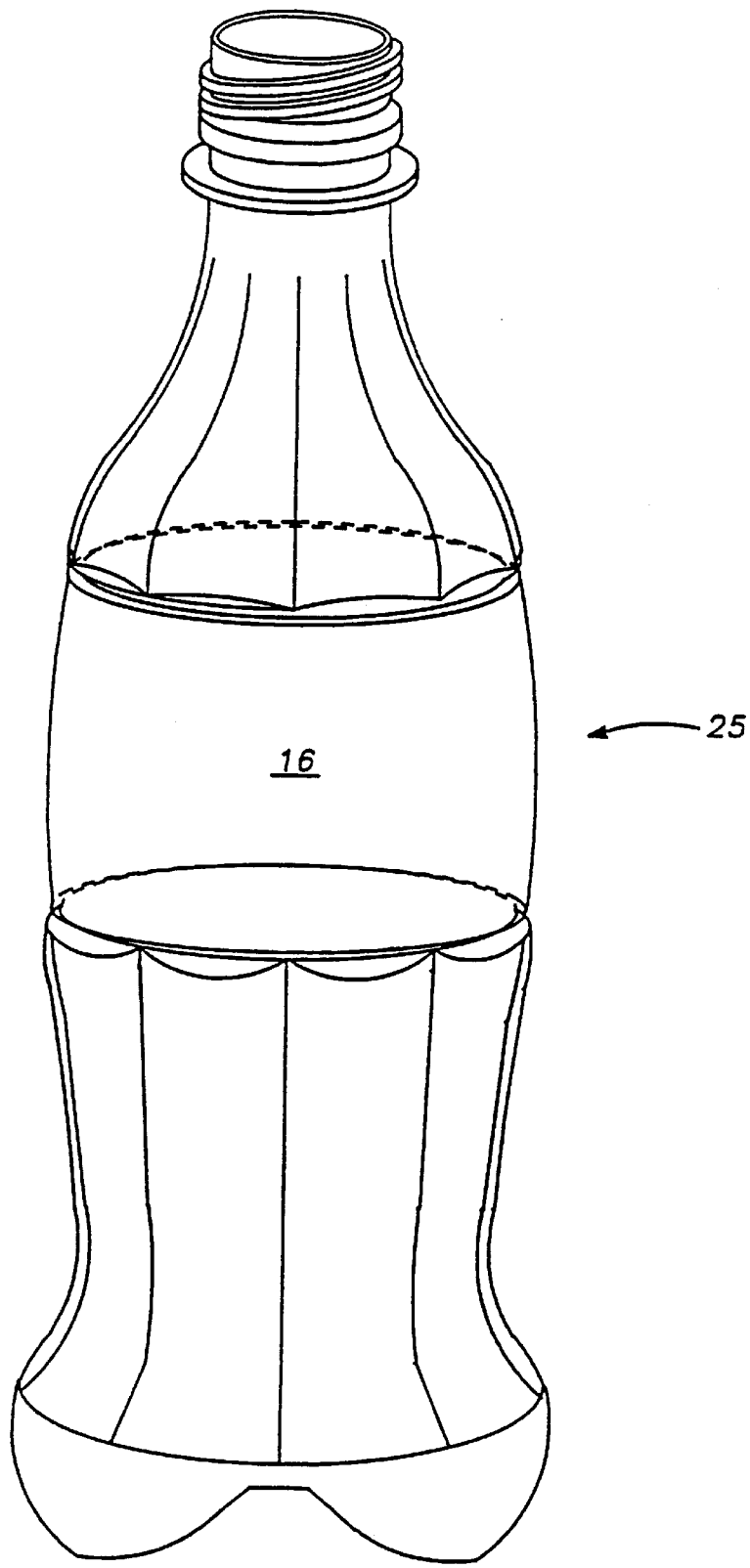
FIG. 6 is a view similar to that in FIG. 2 showing a labeled container.

In FIG. 6 is shown a completely labeled container with the label uniformly applied to and adhered to the convex sector 46.

In the description above, the use of glue or solvent to adhere the label to the container are described and are preferred but heat sealing, for example as in U.S. Pat. No. 5,137,596 may be used, or heat activatable adhesive may be used.

Also, knife-like jets of hot air are preferred but currents of hot air other than knife-like jets may be used, e.g., as in U.S. Pat. No. 4,704,173.

Figure 8:
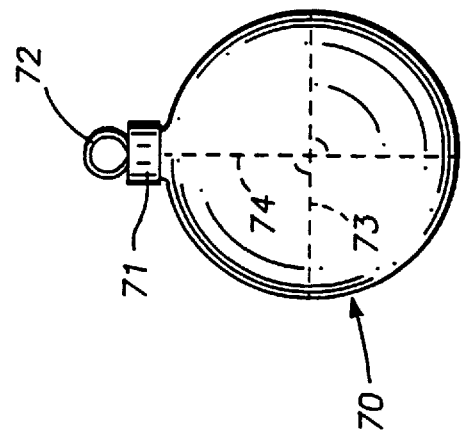
FIG. 8 is a view of a Christmas tree ornament.
Figure 7:
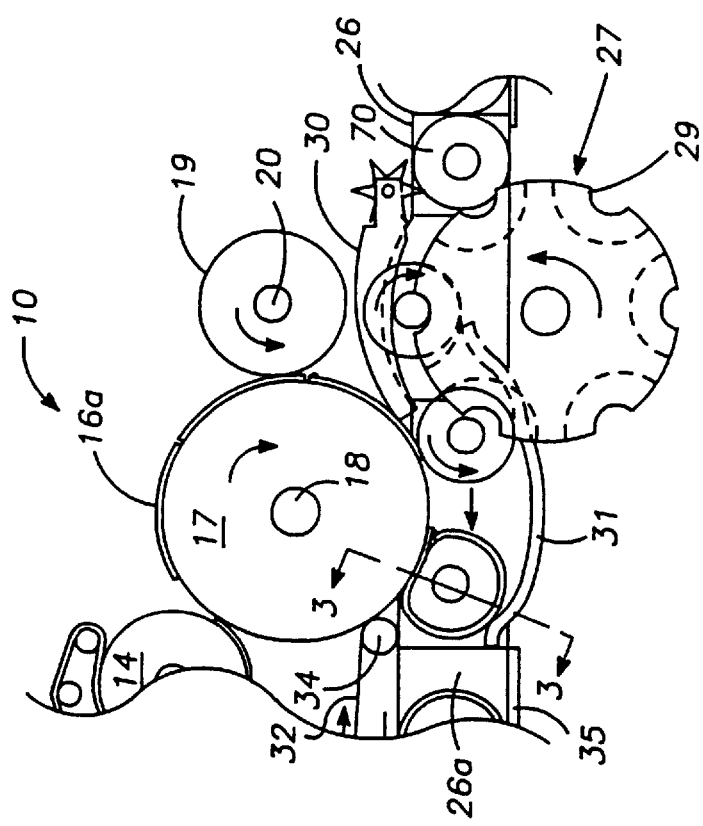
FIG. 7 is a view of a portion of the system and apparatus of FIG. 1 but shown applying decorative bands to Christmas tree ornaments.

Referring now to FIGS. 7–12 and first to FIG. 7, a portion of the machine of FIG. 1 is shown in which, with one exception, the same reference numerals are employed. The exception is the article 70 which takes the place of the container 25 of FIGS. 1 and 2. As shown in FIG. 8 the article 70 is a spherical Christmas tree ornament made in the usual manner of, for example, blown glass, molded plastic (e.g., high density polyethylene, polyethylene terephthalate (PET) or a two piece metal sphere. It has a neck 71 and a loop 72 for suspending it from a branch of a Christmas tree.

As in FIG. 1, the ornament 70 travels along a conveyor 26 and each is picked up in turn by the star wheel 27 and is confined in a pocket 29 of the star wheel 27 and a guide 30 and is caused to move forwardly, to the left as viewed in FIG. 7, between vacuum drum 17 and curved pad 31. A band 16a carried by the vacuum drum 17 is applied to each ornament in turn, then the ornament is released from the vacuum drum and moved forwardly on conveyor 26a compressed between a pad 35 and a moving belt 32. The band 16a replaces the label 16 of FIGS. 1 and 3 and is of heat shrinkable material. It may be coated with a metallic coating and it may bear any desired decorative design.

Referring again to FIG. 8, the ornament 70 is shown as a sphere which has a circumference 73 lying in a plane which is perpendicular to the diameter 74 of the sphere which passes through the neck 71.

Referring now to FIG. 9, it is the same as FIG. 3 except that the spherical ornament 70 is used in place of the container 25. The ornament is shown moving between the vacuum drum 17 and the pad 31, being squeezed between the pad 31 and the vacuum drum 17.

If desired or if necessary, in order to hold and confine the ornament 70 in the right position with the diameter 74 passing through the neck 71 in vertical position. The conveyor 26 may be formed with cups such as shown at 26a in FIG. 9 in which the ornaments are placed in the upright position, i.e., with the neck 71 vertical and which holds the ornament in such position throughout processing. Other positioning means are discussed below.

As will be seen, the pressure exerted on the ornament may be (and preferably is) such as to create a small flattened sector on the sphere such that the band 16a which has adhesive on its leading and trailing ends, is adhered to the sphere along a narrow sector which, although narrow, is not limited to a single line. If the ornament is incompressible then the sector of contact of the band 16a with the sphere will, of course, be narrower than it would be if the sphere is somewhat compressed.

Figure 10:
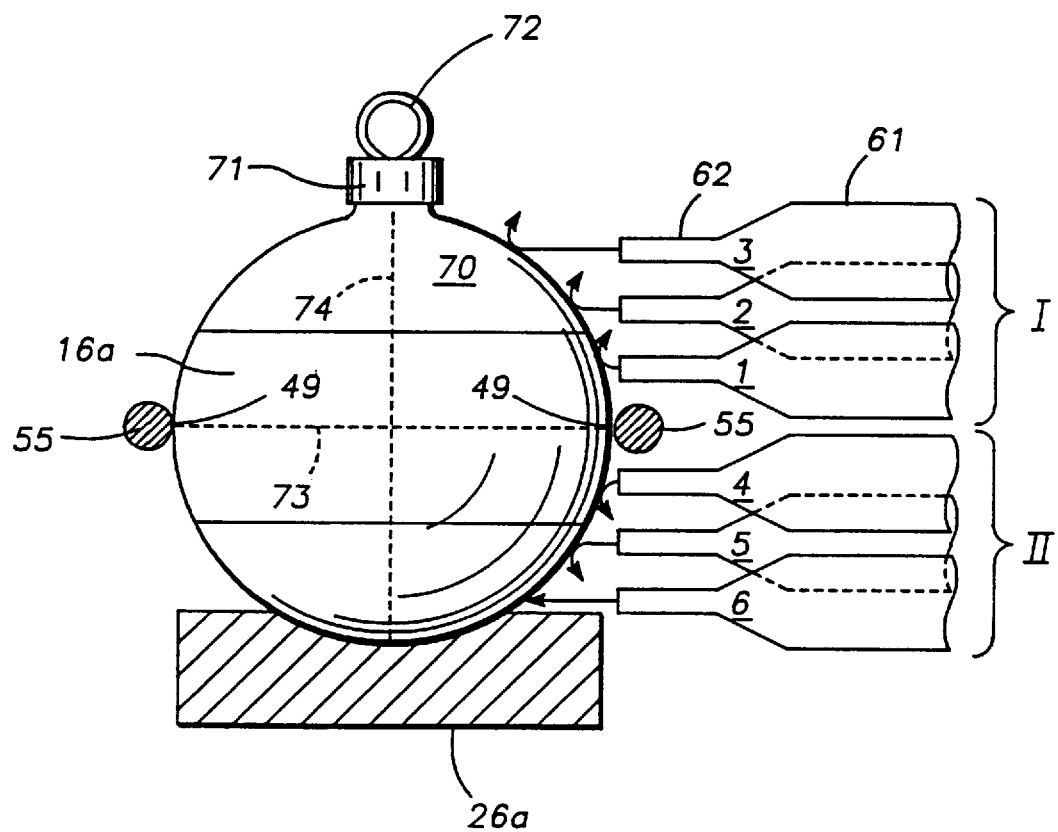
FIG. 10 is a view similar to that of FIG. 4 but showing heat shrinking of the ornamental band onto the Christmas tree ornament of FIG. 8.
Figure 11:
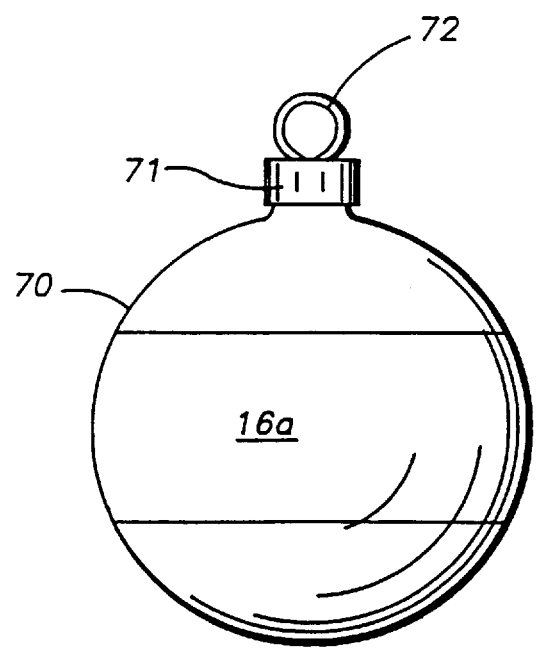
FIG. 11 is a view of the Christmas tree ornament with a decorative band applied to it.

Referring now to FIG. 10, which shows an arrangement of nozzles 61, these blow hot air onto the band 16a which has been applied as shown in FIG. 9, such operation being as described above in connection with FIGS. 4 and 5. The end product is shown in FIG. 11.

Figure 12:
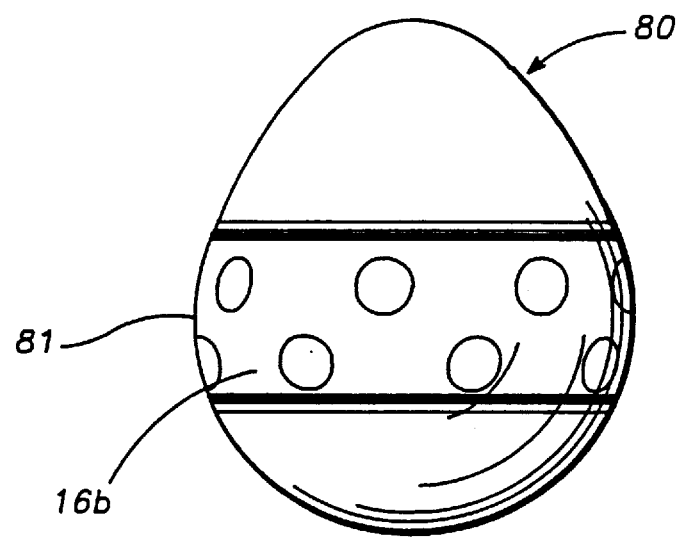
FIG. 12 is a view of an artificial Easter egg having a decorative band heat shrunk around it.

Referring now to FIG. 12, an ornamental band 16b is shown applied to an artificial Easter egg 80. This egg is not completely spherical, being somewhat pear-shaped and having its widest diameter at 81. The shape of the Easter egg 80 at its diameter 81 is circular. An ornamental band 16b is applied in the same manner as the band 16a is applied to the ornament 70, such being adhesively attached to the Easter egg at its widest diameter, then heat shrunk onto the egg.

As will be apparent, it is desirable to hold the Christmas tree ornament 70 so that its diameter 74 is vertical and to hold the Easter egg 80 with its maximum diameter vertical so that the band 16a or 16b is properly applied. This may be accomplished in various ways, e.g., as described above the conveyor or conveyors may be provided with cups in which the articles are placed and which serve to hold them in the proper position. Alternatively a band applying and heat shrinking apparatus may be used such as shown in U.S. Pat. No. 4,416,714 in which each article is gripped, in its turn, between upper and lower chucks such as shown in FIG. 8a of such patent, the chucks being shaped to cup opposite ends of the article and so as not to interfere with the neck 71 and suspension ring 72 of the Christmas tree ornament. The articles may be fed to the turret on a conveyor fitted as described above with cups to align them properly. This assumes, of course, that the structure of the article or the chucks (or both) are such as not to do damage to the articles.

If the sector of maximum circumference or diameter of the article to which the segment is applied is non-circular, e.g., if it is elliptical, a turret type of machine may be used such as shown in FIG. 8a, U.S. Pat. No. 4,416,714 in which the chucks are carried on a mounting which permits radial movement of the chucks together with cam means to move the chucks radially inwardly and outwardly to conform to the varying radius of the sector to which the segment is being applied.

Alternatively the articles may be held by hand and the segment wrapped manually about them.

In addition to the articles described above, the invention may be applied to other articles, e.g., to labels and decorative wrappings for perfume bottles and beauty care products having convex surfaces.

It will thus be apparent that a new and useful method of applying heat shrinkable labels, bands, etc. to convex surfaces, a new and useful system and apparatus for carrying out the method and new and useful articles have been provided.

We claim:

1. A method of applying a segment of heat shrinkable sheet material to an article, said article having a convex surface having a sector of maximum diameter and a central axis perpendicular to the plane of said sector of maximum diameter, said segment having a leading end and a trailing end unattached to the leading end, said method comprising:

(a) securing the leading end of the segment to said sector of maximum diameter, (b) then wrapping the segment around the article by a combination of adhesive and the application of pressure, (c) adhesively attaching the trailing end of the segment to the sector of maximum diameter or lapping it over and attaching it adhesively to the trailing end of the segment, (d) conducting steps (a), (b) and (c) in such manner that only a narrow sector of the segment is attached to said sector of maximum diameter and major portions of the segment on either side of said sector of maximum diameter are unattached to the article, and (e) then applying heat to the segment to shrink said major portions onto the article.

2. A method of applying segments of heat shrinkable sheet material to an article comprising:

(a) providing an article and a segment of heat shrinkable sheet material, said article having a convex surface having a sector of maximum diameter and a central axis perpendicular to the plane of said sector of maximum diameter, said segment having a leading end, a trailing end, upper and lower edges joining the leading and trailing ends, and a body portion bounded by said ends and edges, (b) securing the leading end of the segment to said sector of maximum diameter by a combination of adhesive and the application of pressure, (c) then wrapping the segment around said convex surface and adhesively attaching the trailing end to said sector of maximum diameter or to the leading end of said segment overlying said sector of maximum diameter, (d) so conducting steps (b) and (c) that the segment is attached to the convex surface along a narrow area adjacent said sector of maximum diameter and major portions of the segment on either side of said narrow area are unattached and then, (e) heat shrinking said major portions onto said article to securely affix the segment to said article.

3. A heat shrink apparatus for continuously heat shrinking segments of heat shrinkable material onto articles, each article having a top portion, a bottom portion and a body portion between the top and bottom portions and having a vertical axis extending between the top and bottom portions, said body portion including a convex sector centered on said axis and presenting an area of maximum diameter, said apparatus comprising:

(a) a heat shrinking station, (b) a label applicator for applying heat shrinkable segments to the convex sectors of the articles including means for flattening the area of maximum diameter of each article during label application to increase the height of the maximum diameter portion, means for spinning each article about its vertical axis during such label application and means for adhesively attaching the leading and trailing ends of the label to the flattened portion of said area, (c) means for continuously moving such articles through such station, each article having attached thereto a segment of heat shrinkable sheet material having a leading end, a trailing end, upper and lower edges joining the ends and a body portion bounded by the ends and edges, each segment being wrapped around an article and adhesively attached to said sector of maximum diameter, and (d) means for applying hot air to each segment as it passes through said station, such application being above and below said sector of maximum diameter and being effective to push the segment against the article and to shrink it onto the convex area.

4. The apparatus of claim 3 in which said means (d) is in the form of a series of air nozzles which apply knife-like jets of hot air and are arranged along the path of travel of the articles, one or more of the nozzles being located above and one or more others below the area of maximum diameter.

5. An apparatus for applying segments of heat shrinkable material to articles, such articles each having a top, a bottom and a body portion between the top and bottom and having a vertical axis extending between the top and bottom, said body portion including a convex surface centered on said axis and presenting an area of maximum diameter, said apparatus comprising:

a segment applying station operating continuously to apply said segments to said convex surface of said articles by securing a narrow sector of the segment at the leading end thereof the maximum diameter area of the article while leaving major portions of the segment above and below the narrow sector unattached, wrapping one of said segments around said convex surface of one of said articles, and attaching the narrow sector at the trailing end said one of said segments adhesively to said area of maximum diameter without attaching the major portions of said segment to areas above and below said area of maximum diameter; said segment applying station including a transfer drum for delivering each of said segments from a segment source to said segment applying station and a guide structure, said guide structure being spaced from said transfer drum by a selected distance such that when each of said articles passes between said transfer drum and said guide structure, said transfer drum and said guide structure squeeze said area of maximum diameter inwardly to at least partially flatten a portion of said area of maximum diameter to temporarily increase the height of the area of maximum diameter;

a heat shrink station downstream of said segment applying station and adapted to apply heat to said segment to shrink the unattached portions of said segment onto areas of said convex sector above and below said area of maximum diameter, and means for continuously moving said articles having one of said segments attached to said area of maximum diameter from said segment applying station to and through said heat shrink station.

* * * * *